(12) United States Patent
Uzman (10) Patent No.: US 8,314,374 B2
(45) Date of Patent: Nov. 20, 2012

(54) REMOTELY-GUIDED VERTICAL TAKE-OFF SYSTEM AND METHOD FOR DELIVERING AN ORDNANCE TO A TARGET

(75) Inventor: Burak Uzman, Kensington, MD (US)

(73) Assignee: Aurora Flight Sciences Corporation, Manassas, VA (US)

( * ) Notice: Subject to any disclaimer, the term of this patent is extended or adjusted under 35 U.S.C. 154(b) by 1908 days.

(21) Appl. No.: 11/455,709

(22) Filed: Jun. 20, 2006

(65) Prior Publication Data

US 2012/0211589 A1 Aug. 23, 2012

Related U.S. Application Data

(60) Provisional application No. 60/691,802, filed on Jun. 20, 2005.

(51) Int. Cl.
*F41G 7/20* (2006.01)
*F41G 7/24* (2006.01)
*F41G 7/30* (2006.01)

(52) U.S. Cl. ............ 244/3.11; 244/3.13; 244/3.14; 244/3.21; 244/7 B (58) Field of Classification Search ............ 244/3.1, 244/3.11, 3.21, 3.14, 3.13, 3.16, 3.19, 7 B; 89/1.8, 1.801, 1.804
See application file for complete search history.

(56) References Cited

U.S. PATENT DOCUMENTS

| | | | |
|---|---|---|---|
| 5,144,422 A | 9/1992 | Baker et al. | |
| 5,245,927 A | 9/1993 | Ranes | |
| 6,119,976 A | 9/2000 | Rogers | |
| 6,742,741 B1 | 6/2004 | Rivoli | |
| 2005/0150998 A1 | 7/2005 | Devries et al. | |
| 2005/0183570 A1 | 8/2005 | McMahon | |
| 2005/0230517 A1 | 10/2005 | Troy | |
| 2006/0032971 A1 | 2/2006 | Baldwin | |

OTHER PUBLICATIONS http://www.auvsi.org/iraq/index.cfm.
http://www.globalsecurity.org/intell/systems/dragon-eye.htm.
http://www.globalsecurity.org/intell/systems/desert-hawk.htm.
http://www.globalsecurity.org/intell/systems/uav.htm.
http://www.globalsecurity.org/intell/systems/RQ-11.htm.
http://www.cduav.com.
Charles J. Hanley; "Fear the Reaper, Air Force says" The Washington Times; Jul. 16, 2007; 2 pages.
Unmanned Aircraft Systems (UAS) [http://www.avinc.com/suav.php?PHPSESSID=af5c753304509fc2a16f599322132120]; retrieved on Jan. 23, 2007; 7 pages.
Early US Target Drones; vol. 1.4.0; Chapter 1 of 19; Apr. 6, 2001; [http://www.vectorsite.net/twuav_01.html]; retrieved Jan. 24, 2007; 10 pages.
Fortresses Over The Reich: B-17F & B-17G; vol. 1.1.1; Jul. 1, 2002; [http://www.faqs.org/docs/air/avbl172.html]; retrieved on Jan. 24, 2007; 13 pages.

(Continued)

*Primary Examiner* — Joseph W Sanderson
(74) *Attorney, Agent, or Firm* — Katten Muchin Rosenman LLP (57) ABSTRACT

A lightweight, man-portable weapon delivery system includes a fuselage, and first and second wings mounted to opposing sides of the fuselage. The system includes an electric motor for driving a propeller for providing thrust to propel the system. The electric motor is mounted to the fuselage, and configured to be remotely started by a user. The system includes an imaging device mounted to the system and configured to capture images of a theater of operations of the system. The system includes a communication circuit in communication with the imaging device and configured to transmit the images from the imaging device to the user for viewing the theater of operations of the system for remotely steering the system. The communication circuit is configured to receive commands from the user for steering the system into the target. The system includes a payload configured to store the ordnance.

25 Claims, 3 Drawing Sheets

OTHER PUBLICATIONS

Discovery Channel; Future Weapons; Weapons; Weapon Zone 2; Season 2 Weapons; [http://disc.discovery.com/fansites/future-weapons/weapons/zone2/arsenal-1.html]; retrieved on Jan. 23, 2007.

World War II Glide Bombs: V1.6.0 / Chapter 4 of 13 / Nov. 1, 2006 / Grey Goebel; [http://www.vectorsite.net/twbomb_04.html]; Nov. 1, 2006; retrieved on Jan. 24, 2007; 9 pages.

Tomahawk Block IV Tactical Cruise Missile (TLAM); updated Jan. 27, 2005; URL: [http://www.defense-update.com/products/t/tomahawk.htm]; retrieved on Jun. 29, 2007; 2 pages.

BGM-109 Tomahawk from Wikipedia the free encyclopedia at URL [http://en.wikipedia.org/wiki/BGM-109_Tomahawk], last modified on Jun. 23, 2007; retrieved on Jun. 29, 2007; 5 pages.

AGM-62 Walleye II, Military Analysis Network, retrieved from URL [http://www.fas.org/man/dod-101/sys/smart/agm-62.htm], Updated Apr. 23, 2000, retrieved Jun. 29, 2007; 2 pages.

Rockwell GBU-15(V)/B, Directory of U.S. Military Rockets and Missiles AGM-112, retrieved from URL [http://www.designation-systems.net/dusrm/m-112.html], last updated May 1, 2004, retrieved on Jun. 29, 2007; 4 pages.

REMOTELY-GUIDED VERTICAL TAKE-OFF SYSTEM AND METHOD FOR DELIVERING AN ORDNANCE TO A TARGET

This application claims priority under 35 U.S.C. §119(e) to U.S. Provisional Application No. 60/691,802, filed on Jun. 20, 2005, the entire contents of which are hereby incorporated by reference herein.

BACKGROUND

1. Field of the Invention

The present invention relates to munitions delivery systems. More particularly, the present invention relates to a remotely-guided vertical take-off system and method for delivering an ordnance to a target.

2. Background Information

One advantage of conventional stand-off weapons is that they can engage targets from a distance without endangering the troops operating the weaponry. However, most of these weapons are not portable by a single person, as they are simply too heavy. Such conventional stand-off weapons lack precision strike capability among the surface-launched weapon systems.

Man-portable conventional weapons have reduced effective range and can put the operator in harms way, in addition to their lack of precision. For example, in close-quarters combat, mortars and shoulder-launched weapons can cause friendly force casualties. In such combat situations, enemy forces can make use of defiladed, concrete shelters or other protective blockades or enclosures (e.g., buildings, vehicles and the like), rocks or rock outcroppings, hills and other like terrain that can provide shelter and be used to hide or otherwise obscure the enemy from the infantry. Substantially all of the man-portable weapons currently in use by troops on the ground require the user to see the target. The efficacy of such conventional portable weaponry is greatly reduced if there is a lack of line of sight to the enemy.

Therefore, there is a need for extended range, precision-strike munitions that are portable and effective even when there is no line of sight to the target.

SUMMARY OF THE INVENTION

A remotely-guided vertical take-off system and method for delivering an ordnance to a target are disclosed. In accordance with exemplary embodiments, according to a first aspect of the present invention, a lightweight, man-portable weapon delivery system includes a center body. The system includes a first wing and a second wing. Each of the first and second wings is mounted on opposing sides of the center body. The system includes an electric motor mounted to the center body. The electric motor is configured to drive a propeller for providing thrust to propel the weapon delivery system. The electric motor is configured to be remotely started by a user. The system includes an imaging device mounted to the weapon delivery system. The imaging device is configured to capture images of a theater of operations of the weapon delivery system. The system includes a transceiver circuit in communication with the imaging device. The transceiver circuit is configured to transmit the images from the imaging device to the user for viewing the theater of operations of the weapon delivery system for remotely steering the weapon delivery system. The transceiver circuit is configured to receive commands from the user for steering the weapon delivery system into the target. The system includes a controller circuit in communication with the transceiver circuit. The controller circuit is configured to control actuator surfaces of the first and second wings to steer the weapon delivery system in response to steering commands received from the user. The system includes a motor controller circuit in communication with the electric motor and the transceiver circuit. The motor controller circuit is configured to control the RPM of the electric motor in response to commands received from the user. The system includes a payload. The payload is configured to store an ordnance for delivery to the target.

According to the first aspect, the system can include a power supply in communication with the electric motor. The power supply can be configured to supply electrical power for powering the electric motor. The system can include a remote starter in communication with the electric motor. The remote starter can comprise a timing circuit. The timing circuit can be configured to start the electric motor after a predetermined time period specified by the user. The system can include a global positioning satellite (GPS) circuit in communication with the transceiver circuit. The GPS circuit can be configured to provide GPS coordinates of the weapon delivery system to the user for steering the weapon delivery system. The weapon delivery system can be configured for vertical take-off. According to an exemplary embodiment of the first aspect, the weapon delivery system can be configured to weigh less than approximately five pounds.

According to a second aspect of the present invention, a lightweight, man-portable weapon delivery system for delivering an ordnance to a target includes a fuselage, and a first wing and a second wing. Each of the first and second wings is mounted on opposing sides of the fuselage. The system includes an electric motor. The electric motor is configured to drive a propeller for providing thrust to propel the weapon delivery system. The electric motor is mounted to the fuselage. The electric motor is configured to be remotely started by a user. The system includes an imaging device. The imaging device is mounted to the weapon delivery system. The imaging device is configured to capture images of a theater of operations of the weapon delivery system. The system includes a communication circuit in communication with the imaging device. The communication circuit is configured to transmit the images from the imaging device to the user for viewing the theater of operations of the weapon delivery system for remotely steering the weapon delivery system. The communication circuit is configured to receive commands from the user for steering the weapon delivery system into the target. The system includes a payload. The payload is configured to store the ordnance.

According to the second aspect, the communication circuit can be configured to communicate with the user via a radio frequency (RF) communication link. The system can include a servo controller circuit in communication with the communication circuit. The servo controller circuit can be configured to control actuator surfaces of the first and second wings to steer the weapon delivery system in response to steering commands received from the user. The system can include a power supply in communication with the electric motor. The power supply can be configured to supply electrical power for powering the electric motor. The power supply can comprise, for example, a battery or the like. The system can include a motor controller circuit in communication with the electric motor and the communication circuit. The motor controller circuit can be configured to control the RPM of the electric motor in response to commands received from the user. The system can include a remote starter in communication with the electric motor. The remote starter can comprise a RF receiver configured to receive a RF remote start signal from the user. Alternatively, the remote starter can comprise a light beam receiver configured to receive a light beam remote start signal from the user. The remote starter can comprise a timing circuit. The timing circuit can be configured to start the electric motor after a predetermined time period specified by the user.

According to the second aspect, the ordnance can comprise an explosive munitions or the like. The system can include a GPS circuit configured to provide GPS coordinates of the weapon delivery system to the user for steering the weapon delivery system. The imaging device can be configured to provide video images of the theater of operations of the weapon delivery system to the user for remotely steering the weapon delivery system. The imaging device can comprise a television camera or the like. The imaging device can comprise a laser beam emitter. The laser beam emitter can be configured to emit a laser beam to reflect off of a surface of the target. The weapon delivery system can be guided to the target in accordance with the reflected laser beam. Alternatively, the imaging device can comprise an infrared detector. The infrared detector can be configured to detect an infrared signature emitted by the target. The weapon delivery system can be configured to be guided to the target in accordance with the detected infrared signature of the target. The imaging device can comprise a RF detector. The RF detector can be configured to detect RF emissions provided by the target. The weapon delivery system can be configured to be guided to the target in accordance with the detected RF emissions.

According to the second aspect, the system can include a graphical user interface system. The images received from the weapon delivery system can be displayed to the user through the graphical user interface system. The user can control a flight path of the weapon delivery system through the graphical user interface system. For example, the graphical user interface system can comprise a virtual reality eye-piece worn by the user or the like. According to an exemplary embodiment of the second aspect, the propeller and each of the first and second wings can be collapsible. The weapon delivery system can be configured for vertical take-off. The weapon delivery system can be configured to weigh less than approximately five pounds.

According to a third aspect of the present invention, a lightweight, man-portable weapon delivery system for delivering an ordnance to a target includes a center body, and a first fin and a second fin. Each of the first and second fins is mounted on opposing sides of the center body. The system includes an electric motor mounted to the center body. The electric motor is configured to drive a propeller for providing thrust to propel the weapon delivery system. The electric motor is configured to be remotely started by a user. The system includes a video device mounted to the center body. The video device is configured to provide the user with images for viewing a theater of operations of the weapon delivery system for remotely steering the weapon delivery system into the target. The system includes a payload. The payload is configured to store the ordnance. The weapon delivery system is configured to weigh less than approximately five pounds.

According to a fourth aspect of the present invention, a method of delivering an ordnance to a target includes the steps of: a.) remotely starting an electric motor of a remotely-guided vertical take-off weapon delivery platform, wherein the electric motor drives a propeller for providing thrust to propel the weapon delivery platform, wherein the weapon delivery platform includes first and second wings mounted on opposing sides of a center body, and wherein the weapon delivery platform includes a payload for storing an ordnance; b.) transmitting images to a user from the weapon delivery platform for viewing a theater of operations of the weapon delivery platform for remotely steering the weapon delivery platform to the target by the user; c.) receiving commands from the user for steering the weapon delivery platform; d.) controlling actuator surfaces of the first and second wings to steer the weapon delivery platform in response to steering commands received from the user; e.) controlling the RPM of the electric motor in response to commands received from the user; and f.) delivering the ordnance by steering the weapon delivery platform into the target.

According to the fourth aspect, the method can include the step of: g.) supplying electrical power for powering the electric motor. Step (a) can comprise the step of: a1.) remotely starting the electric motor after a predetermined time period specified by the user. The method can comprise the step of: h.) providing GPS coordinates of the weapon delivery platform to the user for steering the weapon delivery platform. According to an exemplary embodiment of the fourth aspect, the weapon delivery platform can weigh less than approximately five pounds.

According to a fifth aspect, a method of delivering an ordnance to a target includes the steps of: a.) remotely starting an electric motor of a remotely-guided vertical take-off weapon delivery platform, wherein the electric motor drives a propeller for providing thrust to propel the weapon delivery platform, wherein the weapon delivery platform includes first and second wings mounted on opposing sides of a fuselage, and wherein the weapon delivery platform includes a payload for storing an ordnance; b.) transmitting images to a user from the weapon delivery platform for viewing a theater of operations of the weapon delivery platform for remotely steering the weapon delivery platform to the target by the user; c.) receiving commands from the user for steering the weapon delivery platform; and d.) delivering the ordnance by steering the weapon delivery platform into the target.

According to the fifth aspect, information can be communicated between the user and the weapon delivery platform via a RF communication link. The method can include the steps of: e.) controlling actuator surfaces of the first and second wings to steer the weapon delivery platform in response to steering commands received from the user; f.) supplying electrical power for powering the electric motor; and g.) controlling the RPM of the electric motor in response to commands received from the user. Step (a) can comprise one or more of the steps of: a1.) receiving a RF remote start signal from the user; a2.) receiving a light beam remote start signal from the user; or a3.) remotely starting the electric motor after a predetermined time period specified by the user. The ordnance can comprise, for example, an explosive munitions. The method can include the step of: h.) providing global positioning satellite (GPS) coordinates of the weapon delivery platform to the user for steering the weapon delivery platform. Step (b) can comprise the step of: b1.) transmitting video images of the theater of operations of the weapon delivery platform to the user for remotely steering the weapon delivery platform. Step (d) can comprise the steps of: d1.) emitting a laser beam to reflect off of a surface of the target; and d2.) guiding the weapon delivery platform to the target in accordance with the reflected laser beam. Alternatively, step (d) can comprise the steps of: d1.) detecting an infrared signature emitted by the target; and d2.) guiding the weapon delivery platform to the target in accordance with the detected infrared signature of the target. However, step (d) can comprise the steps of: d1.) detecting RF emissions provided by the target; and d2.) guiding the weapon delivery platform to the target in accordance with the detected RF emissions.

According to the fifth aspect, the method can include the steps of: i.) displaying to the user the images received from the weapon delivery platform; and j.) controlling a flight path of the weapon delivery platform by the user in accordance with the images displayed to the user. According to an exemplary embodiment of the fifth aspect, the weapon delivery platform can weigh less than approximately five pounds.

According to a sixth aspect of the present invention, a lightweight, man-portable weapon delivery apparatus includes a center body, and a first wing and a second wing. Each of the first and second wings is mounted on opposing sides of the center body. The system includes an electric means for providing thrust to propel the weapon delivery apparatus. The electric thrust providing means is configured to be remotely started by a user. The system includes means for capturing images. The image capturing means is mounted to the weapon delivery apparatus. The image capturing means is configured to capture images of a theater of operations of the weapon delivery apparatus. The system includes means for communicating information in communication with the image capturing means. The information communicating means is configured to transmit the images from the image capturing means to the user for viewing the theater of operations of the weapon delivery apparatus for remotely steering the weapon delivery apparatus. The information communicating means is configured to receive commands from the user for steering the weapon delivery apparatus into a target. The system includes means for controlling actuator surfaces in communication with the information communicating means. The actuator surface controlling means is configured to control actuator surfaces of the first and second wings to steer the weapon delivery apparatus in response to steering commands received from the user. The system includes means for controlling thrust in communication with the electric thrust providing means and the information communicating means. The thrust controlling means is configured to control the RPM of the electric thrust providing means in response to commands received from the user. The system includes means for storing a payload. The payload storing means is configured to store an ordnance within the center body for delivery to the target.

According to the sixth aspect, the system can include means for supplying power in communication with the electric thrust providing means. The power supplying means can be configured to supply electrical power for powering the electric thrust providing means. The system can include means for remote starting in communication with the electric thrust providing means. The remote starting means can comprise means for timing. The timing means can be configured to start the electric thrust providing means after a predetermined time period specified by the user. The system can include means for supplying GPS coordinates in communication with the information communicating means. The GPS coordinate supplying means can be configured to provide GPS coordinates of the weapon delivery apparatus to the user for steering the weapon delivery apparatus. The weapon delivery apparatus can be configured for vertical take-off. According to an exemplary embodiment of the sixth aspect, the weapon delivery apparatus can be configured to weigh less than approximately five pounds.

According to a seventh aspect of the present invention, a lightweight, man-portable weapon delivery apparatus for delivering an ordnance to a target includes a fuselage, and a first wing and a second wing. Each of the first and second wings is mounted on opposing sides of the fuselage. The system includes an electric means for providing thrust to propel the weapon delivery apparatus. The electric thrust providing means is mounted to the fuselage. The electric thrust providing means is configured to be remotely started by a user. The system includes means for capturing images. The image capturing means is mounted to the weapon delivery apparatus. The image capturing means is configured to capture images of a theater of operations of the weapon delivery apparatus. The system includes means for communicating information in communication with the image capturing means. The information communicating means is configured to transmit the images from the image capturing means to the user for viewing the theater of operations of the weapon delivery apparatus for remotely steering the weapon delivery apparatus. The information communicating means is configured to receive commands from the user for steering the weapon delivery apparatus into the target. The system includes means for storing a payload. The payload storing means is configured to store the ordnance.

According to the seventh aspect, the information communicating means can be configured to communicate with the user via a RF communication link. The system can include means for controlling actuator surfaces in communication with the information communicating means. The actuator surface controlling means can be configured to control actuator surfaces of the first and second wings to steer the weapon delivery apparatus in response to steering commands received from the user. The system can include means for supplying power in communication with the electric thrust providing means. The power supplying means can be configured to supply electrical power for powering the electric thrust providing means. The system can include means for controlling thrust in communication with the electric thrust providing means and the information communicating means. The thrust controlling means can be configured to control the RPM of the electric thrust providing means in response to commands received from the user. The system can include means for remote starting in communication with the electric thrust providing means. The remote starting means can comprise means for receiving a RF remote start signal from the user. Alternatively, the remote starting means can comprise means for receiving a light beam remote start signal from the user. However, the remote starting means can comprise means for timing. The timing means can be configured to start the electric thrust providing means after a predetermined time period specified by the user. The ordnance can comprise, for example, an explosive munitions or the like.

According to the seventh aspect, the system can include means for supplying GPS coordinates. The GPS coordinate supplying means can be configured to provide GPS coordinates of the weapon delivery apparatus to the user for steering the weapon delivery apparatus. The image capturing means can comprise means for providing video images of the theater of operations of the weapon delivery apparatus to the user for remotely steering the weapon delivery apparatus. Alternatively, the image capturing means can comprise means for emitting a laser beam to reflect off of a surface of the target. The weapon delivery apparatus can be guided to the target in accordance with the reflected laser beam. However, the image capturing means can comprise means for detecting an infrared signature emitted by the target. The weapon delivery apparatus can be configured to be guided to the target in accordance with the detected infrared signature of the target. The image capturing means can comprise means for detecting RF emissions provided by the target. The weapon delivery apparatus can be configured to be guided to the target in accordance with the detected RF emissions. The system can include means for displaying the images received from the weapon delivery apparatus to the user. The user can control a flight path of the weapon delivery apparatus in accordance with the displayed images. The weapon delivery apparatus can be configured for vertical take-off. According to an exemplary embodiment of the seventh aspect, the weapon delivery apparatus can be configured to weigh less than approximately five pounds.

According to an eighth aspect of the present invention, a lightweight, man-portable weapon delivery system for delivering an ordnance to a target includes a fuselage, and a first wing and a second wing. Each of the first and second wings is mounted on opposing sides of the fuselage. The system includes an electric motor. The electric motor is configured to drive a propeller for providing thrust to propel the weapon delivery system. The electric motor is mounted to the fuselage. The electric motor is configured to be remotely started by a user. The system includes a payload. The payload is configured to store the ordnance. The system includes a memory that stores steps of a computer program to: a.) generate a capture signal for causing the capturing of images of a theater of operations of the weapon delivery system; b.) generate a transmit signal for causing the transmission of the images to the user for viewing the theater of operations of the weapon delivery system for remotely steering the weapon delivery system by the user; and c.) receive an indication of reception of commands from the user for steering the weapon delivery system into the target. The system includes a processor for accessing the memory to execute the steps.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a remotely-guided vertical take-off system and method for delivering an ordnance to a target. In accordance with exemplary embodiments of the present invention, a lightweight, man-portable stand-off weaponry platform and method can deliver explosive munitions to targets at extended ranges with high accuracy.

More particularly, exemplary embodiments of the present invention are directed to a flying delivery system that can carry an explosive ordnance. The flying delivery system can be, for example, a vertical take-off delivery system, although it can be launched from any suitable angle. The present invention is remotely controllable and steerable by a remote operator. Unlike existing infantry weapon systems, exemplary embodiments of the present invention differ from a projectile, such as that seen in mortars, cannons and shoulder-fired rockets. The weapon delivery system of the present invention includes a real-time steering capability that provides high accuracy to the target. For example, a camera or other like video or image device can be attached or otherwise mounted to the weapon delivery system to provide the images of the theater of operations to the operator. The operator can then use the provided images to steer and control the flight path of the weapon delivery system. The delivery and steering system of the weapon delivery system can also be configured to provide, for example: GPS coordinates to the operator for steering the weapon delivery system to the target; a laser beam that can reflect off of the surface of the target to direct the weapon delivery system into the target; an infrared detector to detect an infrared signature emitted by the target for locating the target; and/or a radio frequency (RF) detector to detect RF emissions provided by the target. Exemplary embodiments of the present invention can also provide a weapon system in which the target can be located by the system after a period of searching for the target, without having any prior knowledge concerning the target's location.

According to exemplary embodiments, the system can be used to reach targets that are not visible to the operator, as in situations where targets are hiding behind objects, such as, for example, walls, rocks, buildings, vehicles or the like. Unlike existing infantry weapons, the present invention does not require the operator to see the target before launching the weapon delivery system. Additionally, the operator can launch the system without being proximally located to the weapon delivery system. For example, the weapon delivery system can include a remote start capability through a radio transmitter, light beam transmitter or the like. Accordingly, the system can allow the operator to launch and use multiple copies of the same weapon without revealing operator's location. Rather, the operator can be a distance away from each of the weapon delivery systems while starting and operating them. Such a delivery system allows the operator, such as a soldier or the like, to remain hidden, although the weapon delivery system may be visible to, for example, enemy or hostile forces. According to exemplary embodiments, the system does not require the operator to be in any specific body position to launch the weapon delivery system, as the operator can be crouching, lying down on their stomach or back, facing the ground, or the like.

Figure 1:
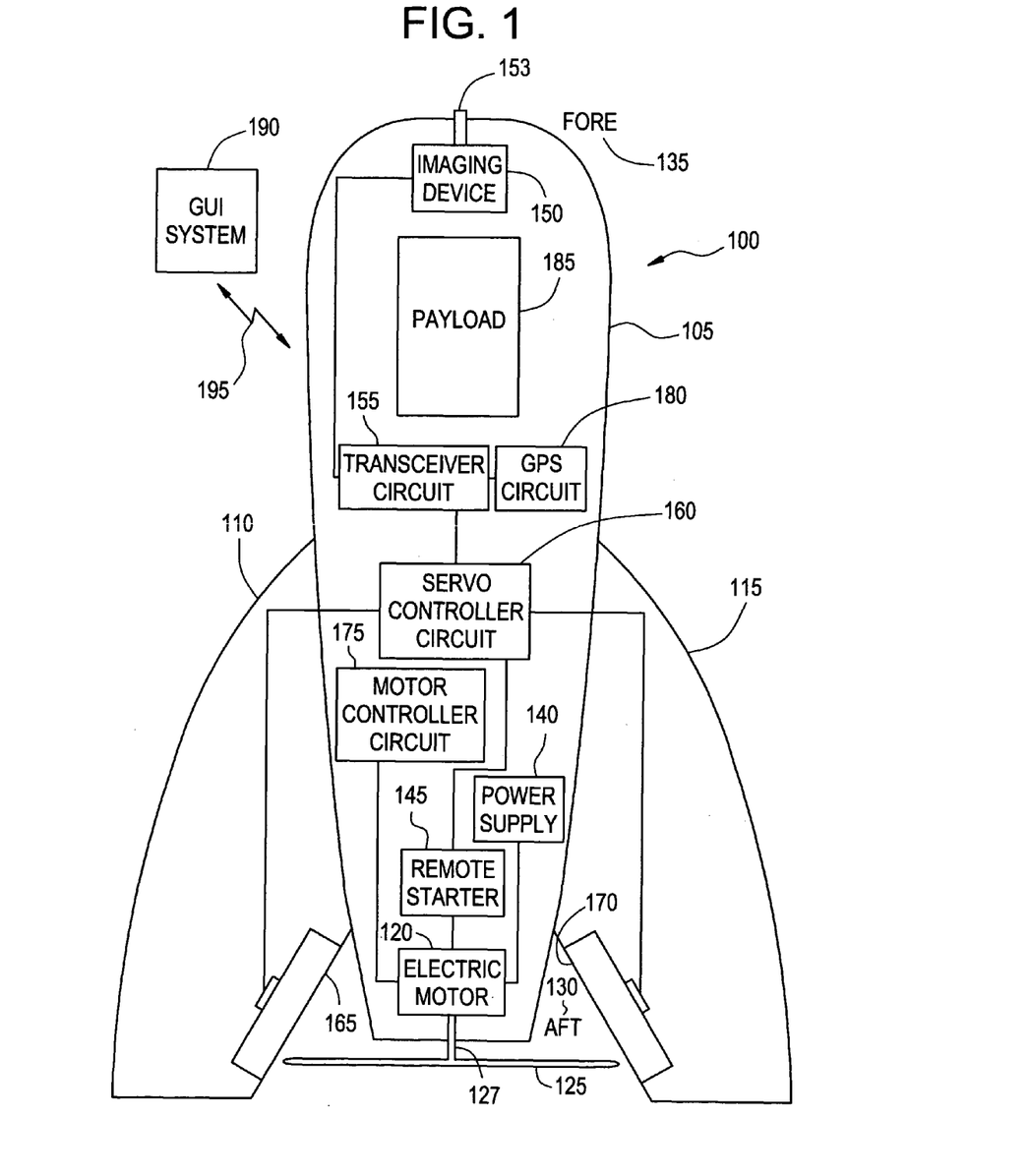
FIG. 1 is a diagram illustrating a lightweight, man-portable weapon delivery system for delivering an ordnance to a target, in accordance with an exemplary embodiment of the present invention.

These and other aspects and embodiments of the present invention will now be described in greater detail. FIG. 1 is a diagram illustrating a lightweight, man-portable weapon delivery system 100 for delivering an ordnance to a target, in accordance with an exemplary embodiment of the present invention. The weapon delivery system (or, simply, "system") 100 includes a center body or fuselage 105. The system 100 also includes a first fin or wing 110 and a second fin or wing 115. Each of the first and second wings 110 and 115 can be mounted (either rigidly or rotatably) on opposing exterior sides of the fuselage 105. For example, according to an alternative exemplary embodiment, if the first and second wings 110 and 115 are rotatably mounted to the fuselage 105, suitable servo motors or other like devices or mechanisms can be used to control the pivot of the wings to assist in controlling the flight path of the system 100. However, according to exemplary embodiments, the first and second wings 110 and 115 can be rigidly mounted at appropriate locations on the fuselage 105.

It is noted that the weapon delivery system 100 can include any suitable number of wings—two wings have been shown merely for purposes of illustration and not limitation. For example, according to an exemplary embodiment, the system 100 can be configured for vertical take-off. For example, as illustrated in FIG. 1, the first and second wings 110 and 115 can be used as "landing pads" or "landing gear" to allow the system 100 to rest in the upright (i.e., substantially vertical with respect to the ground) position when on the ground. Additional wings (e.g., three or four total wings or any suitable number of wings) can be used to provide further stability to the system 100 when in the vertical take-off position.

The system 100 includes an electric motor 120 mounted to or housed within the fuselage 105 (e.g., using suitable struts, stators or other supports). The electric motor 120 is configured to driver a propeller 125 (via a suitable drive shaft 127) for providing thrust to propel the weapon delivery system 100. According to an exemplary embodiment, the electric motor 120 and propeller 125 can be appropriately mounted at the aft end 130 of the system 100. According to an alternative exemplary embodiment, the electric motor 120 and propeller 125 can be suitably mounted at the fore end 135 of the system 100. Alternatively, the electric motor 120 and propeller 125 can be appropriately mounted within the fuselage 105 in a ducted fan configuration or the like. The choice of where the electric motor 120 and propeller 125 are mounted will depend on such factors as, for example, the layout and arrangements of the components of the weapon delivery system 100, the size of the system 100, the size/strength/rating of the electric motor 120 to provide the required thrust via the propeller 125, and other like factors. Any appropriate type of electric motor (e.g., a DC electric motor or the like of suitable horsepower or amperage) capable of driving the propeller 125 to propel the system 100 can be used. In addition, the electric motor 120 can be suitably shielded to minimize acoustics, vibration, any heat signatures, and the like.

To provide power or electricity to the electric motor 120 and to the other components of the system 100 (as needed), the system 100 includes a power supply 140 in (electrical) communication with the electric motor 120. The power supply 140 is configured to supply electrical power for powering the electric motor 120. The power supply 140 can be comprised of any suitable energy source capable of supplying suitable electrical power for powering the electric motor 120 and any other appropriate components of the system 100. For example, the power supply 140 can comprise a battery or battery pack or the like.

As mentioned previously, the weapon delivery system 100 can be remotely operated and controlled by a user or operator. According to exemplary embodiments, the electric motor 120 can be configured to be remotely started by the user. Consequently, the weapon delivery system 100 can include a remote starter 145 in (electrical) communication with the electric motor 120. The remote starter 145 is configured to receive, using any suitable wireless protocol or standard or other appropriate wireless means, a "start" or "ignition" command remotely from the user. For example, according to an exemplary embodiment, the remote starter 145 can comprise a suitable radio frequency (RF) receiver that is configured to receive a RF remote start signal from the user. According to an alternative exemplary embodiment, the remote starter 145 can comprise an appropriate light beam receiver (e.g., laser beam, infrared beam or the like) that is configured to receive a light beam remote start signal from the user. Other suitable wireless devices or means can be used to receive the remote start signal. Upon receipt of the remote start signal or command, the remote starter 145 is configured to start the electric motor 120, for example, by allowing electricity to flow from the power supply 140 to the electric motor 120 (e.g., by engaging a suitable relay or closing an appropriate switch). According to an alternative exemplary embodiment, the remote starter 145 can include a suitable timing circuit. The timing circuit can be configured to start the electric motor 12 after a predetermined time period specified by the user. Such a timing device can allow the user to set up the system 100 and then move or otherwise travel to a safe distance before the system 100 is started, without the need to be within reception distance of the remote starter 145 to issue the remote start command.

The system 100 includes an imaging or video device 150 that can be mounted to the system 100, such as, for example, to the fuselage 105 or at a suitable location on one or both of the first and second wings 110 and 115. For example, the imaging device 150 can be mounted at the fore 135 of the fuselage 105, although the imaging device 150 can be mounted at any suitable location on or within the fuselage 105 or the first and second wings 110 and 115. The imaging device 150 can be either rigidly or rotatably/pivotably mounted to the fuselage 105 to provide, for example, for panning or multi-angle control of the imaging device 150 by the user (e.g., via suitable servo mechanisms for moving the imaging device 150). The imaging device 150 is configured to capture images of the theater of operations of the weapon delivery system 100. The imaging device 150 is also configured to provide the user with those images for viewing the theater of operations of the weapon delivery system 100 so that the user can remotely steer the system 100 to the desired target (whether the target is stationary or moving). In other words, the imaging device 150 is configured to allow the user to see or otherwise view where the system 100 is flying and the terrain or landscape over which the weapon delivery system 100 is traveling. The imaging device 150 includes a suitable imaging lens 153 through which image information or data is obtained or otherwise collected. The imaging device 150 can provide the user with any suitable number of images or image data at any appropriate rate, whether predetermined or controlled by the user. The imaging device 150 can also be in (electrical) communication with the power supply 140 to receive electrical power to operate the device.

The imaging device 130 can be any suitable electrical, electronic or electromechanical circuit or device that is capable of providing images of the theater of operations of the system 100 for locating the target. The imaging device 150 can provide any suitable imaging functionality, such as zooming, panning, wide-angle, and the like by appropriately controlling the imaging lens 153. Alternatively or additionally, the imaging device 150 can be configured to provide video images of the theater of operations of the weapon delivery system 100 to the user for remotely steering the system 100. Accordingly, the imaging device 150 can comprise, for example, a television or CCD camera or the like. However, other types of imaging mechanisms or devices can be used for the imaging device 150. For example, the imaging device 150 can comprise a laser beam emitter or the like. The laser beam emitter can be configured to emit a laser beam to reflect off of a surface of the target. Thus, the system 100 can thereby be guided to the target in accordance with the reflected laser beam, as understood by those of ordinary skill in the art.

According to an alternative exemplary embodiment, the imaging device 150 can comprise an infrared detector. The infrared detector can be configured to detect an infrared signature emitted by the target. For example, a predetermined infrared pattern, signature or signal can be loaded or otherwise stored in or in association with the infrared detector (e.g., in a suitable computer storage medium, such as a computer memory). The infrared detector and/or imaging device 150 can use conventional pattern matching techniques to determine whether any object in the theater of operations matches the stored pattern as the infrared signatures are detected. Alternatively, the infrared detector can be configured to select an infrared signature of a certain magnitude or within a predetermined range of values (e.g., body temperature, or the temperature of a running vehicle engine or the like). Thus, the weapon delivery system 100 can thereby be guided to the target in accordance with the detected infrared signature of the target, as understood by those of ordinary skill in the art.

According to another alternative exemplary embodiment, the imaging device 150 can comprise a RF detector that is configured to detect RF emissions provided by the target (e.g., radio communications emanating from a personal communication device, from a communication hub or center or the like). As with the infrared detector, a predetermined RF pattern, signature or signal can be loaded or otherwise stored in or in association with the RF detector (e.g., in a suitable computer storage medium, such as computer memory). The RF detector and/or imaging device 150 can use conventional pattern matching techniques to determine whether any object in the theater of operations is emitting RF signals that match the stored pattern as the RF emissions are detected. Alternatively, the RF detector can be configured to select a RF signal or emission of a certain magnitude or within a predetermined range of values (e.g., a particular megahertz or gigahertz band of a certain type of communication device used by hostiles in the region). Thus, the weapon delivery system 100 can thereby be guided to the target in accordance with the RF emissions, as understood by those of ordinary skill in the art. As will be recognized by skilled artisans, the imaging device 150 can be comprised of any one, any combination, or all of the aforementioned and other like imaging devices or mechanisms. By use of such imaging devices 150, the system 100 can be configured to automatically locate a target after a period of searching, without having any prior knowledge about the target's location.

The weapon delivery system 100 includes a communication or transceiver circuit 155 in (electrical) communication with the imaging device 155. The transceiver circuit 155 is configured to transmit the images (or image data, video images or the like) from the imaging device 150 to the user for viewing the theater of operations of the weapon delivery system 100. The transceiver circuit 155 is further configured to receive commands from the user for steering the system 100 into the target. In addition, the transceiver circuit 155 can be in (electrical) communication with, for example, the remote starter 145 to receive and pass along the remote start signal from the user for starting the electric motor 120. The transceiver circuit 155 can communicate with the user using any suitable type of wireless communication protocol, standard or other means. For example, the transceiver circuit 155 can be configured to communicate with the user via a RF communication link or the like. However, any suitable type of wireless communication link, such as, for example, infrared, optical, ultrasonic, or the like, can be used to provide transmission and reception of information, commands, and other instructions and data between the system 100 and the user or operator. In certain situations, a wired communication link between the user and the system 100 may be required instead. Consequently, the transceiver circuit 155 can be configured to alternatively or additionally support any suitable type of wired communication protocol, standard or other means via an appropriate wired communication link (e.g., wire, cable or the like).

The weapon delivery system 100 includes a servo controller circuit 160. The servo controller circuit 160 is in (electrical) communication with the transceiver circuit 155. The servo controller circuit 160 is configured to control actuator surfaces 165 and 170 of the first and second wings 110 and 115, respectively, to steer the system 100 in response to and in accordance with the steering or other flight control commands received from the user via the transceiver circuit 155. Each wing can have any suitable number of actuator or control surfaces located at appropriate locations on each wing (e.g., on the fore or aft of each wing), depending on the needed control and desired flight characteristics of the weapon delivery system 100. The servo controller circuit 160 can comprise any suitable type of electrical, electronic or mechanical device capable of actuating the respective control or actuator surfaces of the wings. However, the servo controller circuit 160 can be comprised of any combination of hardware, firmware and software that is capable of performing the function associated with the servo controller circuit 160. The servo controller circuit 160 can also comprise any suitable type of pneumatic, hydraulic or fluidic computer, mechanism (e.g., servo valves) or links in addition or alternatively to the combination of hardware, firmware and software. The servo controller circuit 160 can also be in (electrical) communication with the power supply 140 to receive electrical power to operate the circuit.

The weapon delivery system 100 can include a motor controller circuit 175. The motor controller circuit 175 is in (electrical) communication with the electric motor 120 and the transceiver circuit 155. The motor controller circuit 175 can be configured to control the RPM of the electric motor 120 in response to command or other instructions received from the user via the transceiver circuit 155. The granularity of control over the motor speed will depend on the needs of the user and the theater of operations in which the system 100 is to operate, and can be anywhere from course to fine. For example, the motor controller circuit 175 can store a look-up table or the like in a suitable computer memory (located in the motor controller circuit 175 or elsewhere in the system 100) that matches motor control commands with motor RPM. For each motor control command received from the user, the motor controller circuit 175 can look-up the corresponding motor RPM for the electric motor 120, and then electrically control the electric motor 120 (e.g., by reducing or increasing power to the electric motor 120 from the power supply 140) to match the retrieved motor RPM. Other appropriate methods for controlling the speed of the electric motor 120 can also be used. The user can thus control the speed of the weapon delivery system 100 during flight, in addition to its flight path. The motor controller circuit 175 can also be in (electrical) communication with the power supply 140 to receive electrical power to operate the circuit.

In addition to images for viewing the theater of operations, the system 100 can include a global positioning satellite (GPS) circuit 180. The GPS circuit 180 can be in (electrical) communication with transceiver circuit 155. The GPS circuit 180 can be configured to provide GPS coordinates of the weapon delivery system 100 to the user. The GPS coordinates can be used by the user in addition or alternatively to the provided images to steer or otherwise control the flight path of the system 100. For example, the GPS circuit 180 can be used to set a desired location in memory to which the system 100 is to travel (e.g., to a known target location) to provide for automatic flight control of the system 100 (e.g., akin to "auto pilot" or the like). The GPS circuit 180 can also be in (electrical) communication with the power supply 140 to receive electrical power to operate the circuit.

Those of ordinary skill in the art will recognize that other circuits, devices, modules or components can be mounted on or within the system 100, depending on the needs of the user and the theater of operations in which the system 100 is to operate, among other factors. For example, an altimeter circuit can be used to provide the altitude of the system 100 while in flight, with the altitude information radioed back to the user via the transceiver circuit 155 or used by the system 100 to control its flight path automatically. Additionally or alternatively, a speed sensor or mechanism can be mounted within or on the fuselage 105 or on one or both of the first and second wings 110 and 115 to provide the speed of the system 100 while in flight, with the speed information radioed back to the user via the transceiver circuit 155 or used by the system 100 to control its flight path automatically. Through such a combination of circuits, devices, modules and components, the user can be provided with a full array of information on the system 100, the theater of operations, and the terrain during flight to effectively steer, control or otherwise guide the system 100 to the target or for performing other duties, such as reconnaissance or the like. Alternatively, such a combination of circuits, devices, modules and components can be used to provide automatic control of the system 100 to reach a desired location or target without the need for further operator commands or instructions.

The weapon delivery system 100 includes a payload 185. One or more payloads 185 can be mounted to the inside or outside of the fuselage 105, anywhere on or to the first and second wings 110 and 115 (e.g., on each wingtip), or any other suitable location(s) of the system 100. The payload 185 is configured to store an ordnance on or within the fuselage 105 for delivery to the target. However, the payload 185 can be used to store or otherwise carry any suitable object or device, such as additional reconnaissance equipment (e.g., additional cameras or recording equipment), additional guidance equipment, additional power supplies (to prolong flight time) or the like. For ordnances, the payload 185 can be configured to carry an explosive munitions of any suitable size. However, as the system 100 is configured to be lightweight and portable by the user, the size of the munitions should likewise be lightweight and portable. For example, according to an exemplary embodiment, the payload 185 can carry an explosive munitions comprising an approximately eight-ounce high explosive charge. However, other munitions of differing sizes and explosive forces can also be carried by the payload 185, so long as, for example the electric motor 120, propeller 125 and first and second wings 110 and 115 are configured to propel and carry such a load. The explosive munitions carried in the payload 185 can be configured to detonate upon landing (or crashing) of the weapon delivery system 100 into the target by using an appropriate triggering device (e.g., a detonation switch that is activated by compression). Alternatively, the explosive munitions can be configured to detonate at a predetermined time (e.g., by using an appropriate timing circuit), a predetermined altitude (e.g., by using an suitable altimeter circuit), a predetermined location (e.g., by using the GPS circuit 180), or any combination thereof.

Thus, unlike conventional man-portable weapon systems, the user is provided with highly precise control over where, how, and even when the explosive munitions detonates with respect to the target. In addition, as the system 100 is remotely controlled by the user by viewing images provided by the imaging device 150 through the transceiver circuit 155, the user neither needs to be in the line of sight of the target nor in harms way to use the weapon delivery system 100. Any suitable number of such systems 100 can be launched and/or be in flight at any time, allowing the user or operator to potentially engage multiple targets substantially simultaneously or repeatedly.

To view the images and other information provided to the user, and to otherwise control the system 100, any suitable type of graphical user interface (GUI) system 190 can be used. The GUI system 190 can be in wireless communication (via a suitable wireless communication link 195) with the system 100 (e.g., via the transceiver circuit 155) to provide for the exchange of information between the system 100 and the user. For example, the images received from the weapon delivery system 100 can be displayed to the user through the GUI system 190, and the user can control the flight path of the system 100 through the GUI system 190. The GUI system can be comprised of any suitable software program capable of presenting textual and/or graphical information to the user. The software code of the software program can be programmed using conventional techniques known to those having ordinary skill in the art of computer programming.

For example, the GUI system 190 can be a suitable software program developed to run in the Microsoft WINDOWS™ operating system environment on a personal computer. However, the GUI system can be designed to run in any suitable graphical, windowed operating system, including Apple Computer's MAC OS™, RedHat's LINUX™, Hewlett Packard's HP-UX™, IBM's OS/2™, or any other suitable operating system running on any suitable computer system. According to exemplary embodiments, since the weapon delivery system 100 is to be lightweight and portable by the user so that one or more of the systems 100 can be carried by each user, the personal computer or personal computing device on which the GUI system 190 is run can be comprised of, for example, a laptop computer or a suitable handheld device, such as, for example, a PDA or the like, with an appropriate wireless interface. The user can then control the system 100 using appropriate inputs into the laptop or handheld device, such as mouse clicks, keyboard presses (e.g., up or down arrow), alphanumeric instructions or commands (e.g., entered via the keyboard or keypad), or by selecting commands or instructions from a menu presented to the user on one or more screens of the GUI system 190.

According to an alternative exemplary embodiment, the GUI system 190 can be comprised of a suitable virtual reality eye-piece than can be worn by the user. For example, the image data or information received from the system 100 can be processed using an appropriate processing architecture (e.g., dedicated CPUs or the like) to render a virtual three-dimensional image of the theater of operations in which the system 100 is flying or otherwise operating. The user can then provide commands or instructions to the system 100 using a small keypad in (electrical) communication with the eye-piece, or even through the use of verbal (auditory) commands and instructions via a microphone or the like. Such alternative exemplary embodiments can be used to further reduce the weight and bulk of the components of the system 100 that are carried by the user.

As mentioned previously, the weapon delivery system 100 is configured to be man-portable so that one or more of the systems 100 can be carried by each user without adding substantial bulk to any load already carried by the user. According to exemplary embodiments, the system 100 can be collapsible or otherwise foldable into a smaller form for purposes of transportation. For example, the propeller 125 can be collapsible or foldable, as well as each of the first and second wings 110 and 115 and other components of the fuselage 105, if desired. To use the system 100, the user can simply unfold the propeller 125 and first and second wings 110 and 115 (e.g., by locking them into their appropriate positions) before initiating launch.

In addition, the weapon delivery system 100 is configured to be lightweight so that one or more of the systems 100 can be carried by each user without adding substantial weight to any load already carried by the user. According to exemplary embodiments, the system 100 can be configured to weigh less than approximately five pounds (not including the GUI system 190), although the system 100 can be configured to weigh any suitable amount, depending on the needs of the system 100, the amount of load capable of being carried by each user, and the like.

To address such requirements, the system 100 can be designed using components of any suitable size, dimensions, configuration and other like characteristics. For purposes of illustration and not limitation, some exemplary design characteristics of the system 100 are provided in TABLE 1.

TABLE 1

Exemplary Design Characteristics of the Weapon Delivery System 100

| | |
|---|---|
| PROPELLER DIAMETER | 12 inches |
| FUSELAGE LENGTH | 18 inches |
| CT | 0.024 |
| FM | 0.6 |
| DISC LOADING | 6 pounds/foot$^2$ |
| POWER FOR CLIMB | 800 watts |
| MAXIMUM CLIMB RATE | 17 meters/second |
| WING SPAN | 18 inches |
| WING ROOT | 12 inches |
| WING AREA (PLN) | 105 inches$^2$ |
| S-WET | 400 inches$^2$ |
| CL_max | 0.85 |
| CL_cr | 0.37 |
| DRAG (@ 80 knots) | 7 Newtons |
| DASH SPEED | 80 knots |
| STALL SPEED | 60 knots |

The design characteristics illustrated in TABLE 1 will vary depending on, for example, the needs of the user, the theater of operations in the system 100 is to be used, the types of targets the system 100 is to be used against, and the like. Continuing with the present illustration, TABLE 2 provides several exemplary component characteristics to implement the weapon delivery system 100, including their corresponding weights.

TABLE 2

Exemplary Component Characteristics of the Weapon Delivery System 100

| | |
|---|---|
| 600 WATT ELECTRIC MOTOR | 600 grams |
| Li-POLY BATTERIES | 600 grams |
| TV CAMERA | 80 grams |
| VIDEO TX CARD | 45 grams |
| 2 SERVOS & RECEIVER | 30 grams |
| AIRFRAME (fuselage and wings) | 500 grams |
| PAYLOAD | 250 grams |
| TOTAL WEIGHT | 2105 grams |

As can be seen in TABLE 2, the total weight for the illustrated exemplary system 100 is 2105 grams≈4.6 pounds.

Given such design and component characteristics as illustrated in TABLES 1 and 2, the system 100 can have a range of approximately 1.5 miles. In a typical operation, the system 100 can be set up in a substantially vertical take-off position and be launched from such an orientation. After climbing substantially vertically (with respect to the ground) for approximately fifteen to approximately twenty seconds, the system 100 can reach an altitude of approximately 300 feet. At such time, the system 100 (or the user operating the system 100) can alter its pitch to a substantially horizontal orientation (with respect to the ground), and the user can appropriately control, direct or otherwise steer the system 100 while in flight to locate the desired target. After approximately seventy-five to approximately eighty seconds, the system 100 can reach a distance of approximately 2400 meters or approximately 1.5 miles. When the system 100 reaches the designated target, the user can manually or the system 100 can automatically cause a dive or descent into the target, with the explosive munitions carried in the payload 185 detonating upon impact. According to an exemplary embodiment, the total flight time for the mission can range from approximately eighty seconds to approximately one hundred seconds, but will vary depending on the range to the target, the type of mission, and other like factors. It is noted that the system 100 can also be made to hover in a substantially vertical orientation if desired, for example, to take images/video or to perform other surveillance of the target or given geographical area (e.g., if the payload 185 is used to house additional reconnaissance equipment or devices).

Accordingly, the exemplary weapon delivery system 100 can weigh less than a M72 Light Anti-Tank Weapon (LAW), have a longer effective range than a M107 long range sniper rifle, and have substantially the same lethality as a 40 mm grenade used in grenade launchers.

Figure 2A:
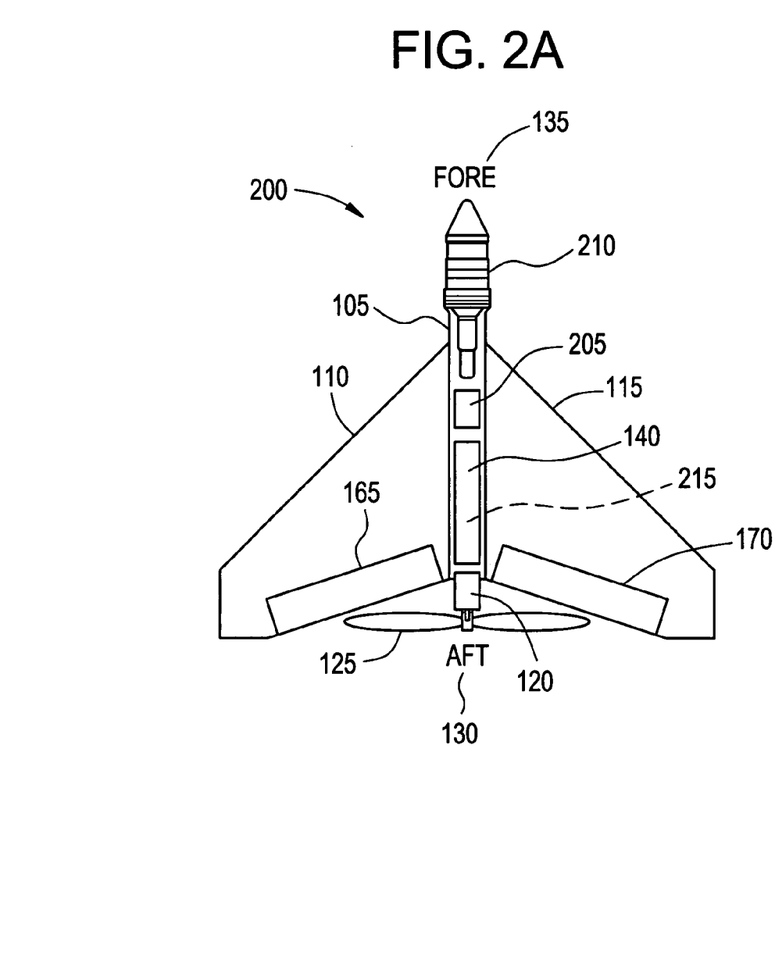
FIG. 2 is a diagram illustrating a lightweight, man-portable weapon delivery system for delivering an ordnance to a target, in accordance with an alternative exemplary embodiment of the present invention.
Figure 2B:
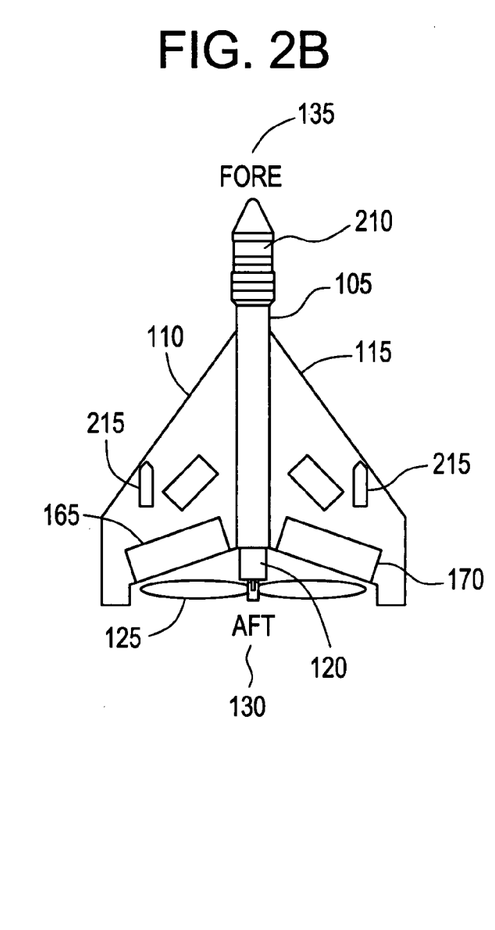

As will be recognized by skilled artisans, other configurations of the weapon delivery system 100 can be implemented, and are not limited to the exemplary embodiment illustrated in TABLES 1 and 2. For example, FIG. 2 is a diagram illustrating a lightweight, man-portable weapon delivery system 200 for delivering an ordnance to a target, in accordance with an alternative exemplary embodiment of the present invention. A front view of the system 200 is illustrated in FIG. 2A, while a side view of the system 200 is illustrated in FIG. 2B. The system 200 includes a center body or fuselage 105. First and second fins or wings 110 and 115, respectively, with respective control surfaces 165 and 170, are mounted on opposing sides of the fuselage 105. The system 200 includes an electric motor 120 mounted at the aft of the fuselage 105, and connected to the propeller 125 at the aft of the fuselage 105 for providing thrust to propel the system 200. A battery pack 140 is mounted within the fuselage 105 fore of the electric motor 120 and in (electrical) communication therewith. An avionics suite 205 is mounted within the fuselage 105 fore of the battery pack 140. The avionics suite 205 can include such functionality as, for example, the remote starter 145, the transceiver circuit 155, the servo controller circuit 160, the motor controller circuit 175, and the GPS circuit 180, as well as other suitable functionality or features for flying or otherwise controlling the flight path of the system 200. A warhead 210 is housed at the very fore of the system 200 (e.g., in the nose cone), rather than in the mid-to-upper body of the fuselage 105 as is the payload 185 of the system 100. The system 200 includes seekers 215 for locating the target, with each seeker 215 mounted on a respective wing. The functionality and features of the seekers 215 is substantially identical to that of the imaging device 150 discussed with reference to the system 100 illustrated in FIG. 1. Other such configurations of the weapon delivery system according to exemplary embodiments of the present invention can be designed or otherwise architected to suit the needs of the user.

The weapon delivery systems 100 and 200 do not require any specific body position of the user to launch or otherwise operate the systems 100 and 200. The user can be in a crouching position, lying on their stomach or back, facing the ground, or the like. As discussed previously, the user can be a distance away from the weapon platform, allowing the user to remain hidden even if the location of the systems 100 and 200 are not. With the freedom of user movement afforded by exemplary embodiments of the present invention, the systems 100 and 200 can be operated from various platforms, including, but not limited to, moving ground, air and water vehicles (e.g., to protect conveys and/or neutralize Improvised Explosive Devices (IEDs), mines, or other booby traps), and the like.

Each of the appropriate modules or components of weapon delivery systems 100 and 200, including, for example, the remote starter 145, imaging device 150, transceiver circuit 155, servo controller circuit 160, motor controller circuit 175, GPS circuit 180, avionics suite 205, and seekers 215, or any combination thereof, can be comprised of any suitable type of electrical or electronic component or device that is capable of performing the functions associated with the respective element. According to such an exemplary embodiment, each such module, component or device can be in communication with another such module, component or device using any appropriate type of electrical connection that is capable of carrying electrical information. Alternatively, each of the appropriate modules or components of the systems 100 and 200 can be comprised of any combination of hardware, firmware and software that is capable of performing the functions associated with the respective module or component. For example, each of the aforementioned modules or components can be comprised of suitable software code that are each programmed using conventional techniques known to those having ordinary skill in the art of computer programming.

Alternatively, the systems 100 and 200 can be comprised of one or more microprocessors and associated memory(ies) that store the steps of a computer program to perform the functions of any, any combination, or all of the appropriate modules or components of the systems 100 and 200. The microprocessor can be any suitable type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), an electrically-erasable programmable read-only memory (EEPROM), a computer-readable medium, or the like. The memory can be any suitable type of computer memory or any other type of electronic storage medium, such as, for example, read-only memory (ROM), random access memory (RAM), cache memory, compact disc read-only memory (CDROM), electro-optical memory, magneto-optical memory, or the like. As will be appreciated based on the foregoing description, the memory can be programmed using conventional techniques known to those having ordinary skill in the art of computer programming. For example, the actual source code or object code of the computer program can be stored in the memory.

The systems 100 and 200 can include other suitable modules, components, avionics and the like (whether implemented in hardware, software, firmware or any combination thereof) as required by the specific implementations of exemplary embodiments of the present invention to suit the needs of the user, the theater of operation in which the systems 100 and 200 will be used, and other like factors.

Figure 3:
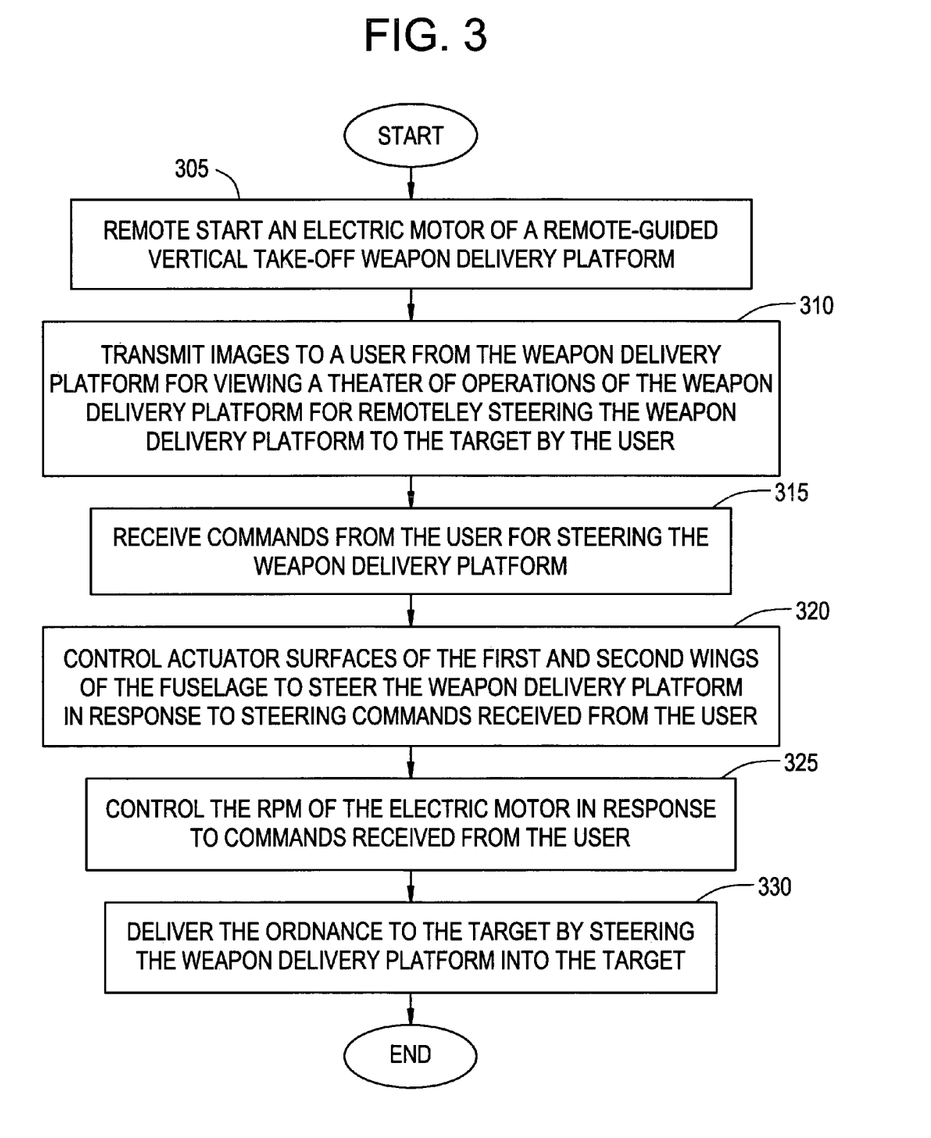
FIG. 3 is a flowchart illustrating steps for delivering an ordnance to a target, in accordance with an exemplary embodiment of the present invention.

FIG. 3 is a flowchart illustrating steps for delivering an ordnance to a target, in accordance with an exemplary embodiment of the present invention. In step 305, an electric motor of a remotely-guided vertical take-off weapon delivery platform can be remotely started. The electric motor can drive a propeller for providing thrust to propel the weapon delivery platform. The weapon delivery platform can include first and second wings mounted on opposing sides of a center body. The weapon delivery platform can include a payload for storing an ordnance. In step 310, images can be transmitted to a user from the weapon delivery platform for viewing a theater of operations of the weapon delivery platform for remotely steering the weapon delivery platform to the target by the user. In step 315, commands can be received from the user for steering the weapon delivery platform. In step 320, actuator surfaces of the first and second wings can be controlled to steer the weapon delivery platform in response to steering commands received from the user. In step 325, the RPM of the electric motor can be controlled in response to commands received from the user. In step 330, the ordnance can be delivered by steering the weapon delivery platform into the target.

Information can be communicated between the user and the weapon delivery platform via a RF communication link or the like. The method can include the step of supplying electrical power for powering the electric motor. According to an exemplary embodiment, step 305 can comprise one or more of the steps of: receiving a RF remote start signal from the user; receiving a light beam remote start signal from the user; or remotely starting the electric motor after a predetermined time period specified by the user. The method can include the step of providing GPS coordinates of the weapon delivery platform to the user for steering the weapon delivery platform. According to an exemplary embodiment, step 310 can comprises the step of transmitting video images of the theater of operations of the weapon delivery platform to the user for remotely steering the weapon delivery platform. Step 330 can comprise the steps of: emitting a laser beam to reflect off of a surface of the target; and guiding the weapon delivery platform to the target in accordance with the reflected laser beam. Alternatively, step 330 can comprise the steps of: detecting an infrared signature emitted by the target; and guiding the weapon delivery platform to the target in accordance with the detected infrared signature of the target. However, step 330 can comprise the steps of detecting RF emissions provided by the target; and guiding the weapon delivery platform to the target in accordance with the detected RF emissions. According to an additional exemplary embodiment, the method can include the steps of: displaying to the user the images received from the weapon delivery platform; and controlling a flight path of the weapon delivery platform by the user in accordance with the images displayed to the user. The ordnance can comprise, for example, an explosive munitions or the like. According to an exemplary embodiment of the present invention, the weapon delivery platform can weigh less than approximately five pounds.

Any or all of the steps of a computer program as illustrated in FIG. 3 for delivering an ordnance to a target can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A lightweight, man-portable weapon delivery system, comprising:
   a center body,
   a first wing and a second wing,
     wherein each of the first and second wings is mounted on opposing sides of the center body;
   an electric motor mounted to the center body,
     wherein the electric motor is configured to drive a propeller for providing thrust to propel the weapon delivery system, and
     wherein the electric motor is configured to be remotely started by a user;
   an imaging device mounted to the weapon delivery system, and
     wherein the imaging device is configured to capture images of a theater of operations of the weapon delivery system;
   a transceiver circuit in communication with the imaging device,
     wherein the transceiver circuit is configured to transmit the images from the imaging device to the user for viewing the theater of operations of the weapon delivery system for remotely steering the weapon delivery system, and
     wherein the transceiver circuit is configured to receive commands from the user for steering the weapon delivery system into a target;
   a controller circuit in communication with the transceiver circuit,
     wherein the controller circuit is configured to control actuator surfaces of the first and second wings to steer the weapon delivery system in response to steering commands received from the user;
   a motor controller circuit in communication with the electric motor and the transceiver circuit,
     wherein the motor controller circuit is configured to control a RPM of the electric motor in response to commands received from the user; and
   a payload,
     wherein the payload is configured to store an ordnance for delivery to the target.

2. The system of claim 1, wherein the weapon delivery system is configured to weigh less than about five pounds.

3. A lightweight, man-portable weapon delivery system for delivering an ordnance to a target, comprising:
   a fuselage,
   a first wing and a second wing,
     wherein each of the first and second wings is mounted on opposing sides of the fuselage;
   an electric motor,
     wherein the electric motor is configured to drive a propeller for providing thrust to propel the weapon delivery system,
     wherein the electric motor is mounted to the fuselage, and
     wherein the electric motor is configured to be remotely started by a user;
   an imaging device,
     wherein the imaging device is mounted to the weapon delivery system, and
     wherein the imaging device is configured to capture images of a theater of operations of the weapon delivery system;
   a communication circuit in communication with the imaging device,
     wherein the communication circuit is configured to transmit the images from the imaging device to the user for viewing the theater of operations of the weapon delivery system for remotely steering the weapon delivery system, and
     wherein the communication circuit is configured to receive commands from the user for steering the weapon delivery system into the target; and
   a payload,
     wherein the payload is configured to store the ordnance.

4. The system of claim 3, wherein the communication circuit is configured to communicate with the user via a radio frequency (RF) communication link.

5. The system of claim 3, comprising:
   a servo controller circuit in communication with the communication circuit,
     wherein the servo controller circuit is configured to control actuator surfaces of the first and second wings to steer the weapon delivery system in response to steering commands received from the user.

6. The system of claim 3, comprising:
   a power supply in communication with the electric motor,
     wherein the power supply is configured to supply electrical power for powering the electric motor.

7. The system of claim 6, wherein the power supply comprises a battery.

8. The system of claim 3, comprising:
   a motor controller circuit in communication with the electric motor and the communication circuit,
     wherein the motor controller circuit is configured to control a RPM of the electric motor in response to commands received from the user.

9. The system of claim 3, comprising:
   a remote starter in communication with the electric motor.

10. The system of claim 9, wherein the remote starter comprises:
    a radio frequency (RF) receiver configured to receive a RF remote start signal from the user.

11. The system of claim 9, wherein the remote starter comprises:
    a light beam receiver configured to receive a light beam remote start signal from the user.

12. The system of claim 9, wherein the remote starter comprises:
    a timing circuit,
      wherein the timing circuit is configured to start the electric motor after a predetermined time period specified by the user.

13. The system of claim 3, wherein the ordnance comprises an explosive munitions.

14. The system of claim 3, comprising:
    a global positioning satellite (GPS) circuit configured to provide GPS coordinates of the weapon delivery system to the user for steering the weapon delivery system.

15. The system of claim 3, wherein the imaging device is configured to provide video images of the theater of operations of the weapon delivery system to the user for remotely steering the weapon delivery system.

16. The system of claim 3, wherein the imaging device comprises a television camera.

17. The system of claim 3, wherein the imaging device comprises:
a laser beam emitter,
wherein the laser beam emitter is configured to emit a laser beam to reflect off of a surface of the target, and
wherein the weapon delivery system is guided to the target in accordance with the reflected laser beam.

18. The system of claim 3, wherein the imaging device comprises:
an infrared detector,
wherein the infrared detector is configured to detect an infrared signature emitted by the target, and
wherein the weapon delivery system is configured to be guided to the target in accordance with the detected infrared signature of the target.

19. The system of claim 3, wherein the imaging device comprises:
a radio frequency (RF) detector,
wherein the RF detector is configured to detect RF emissions provided by the target, and
wherein the weapon delivery system is configured to be guided to the target in accordance with the detected RF emissions.

20. The system of claim 3, comprising:
a graphical user interface system,
wherein the images received from the weapon delivery system are displayed to the user through the graphical user interface system, and
wherein the user controls a flight path of the weapon delivery system through the graphical user interface system.

21. The system of claim 3, wherein the propeller is collapsible.

22. The system of claim 3, wherein each of the first and second wings are collapsible.

23. The system of claim 3, wherein the weapon delivery system is configured for vertical take-off.

24. The system of claim 3, wherein the weapon delivery system is configured to weigh less than about five pounds.

25. A lightweight, man-portable weapon delivery system for delivering an ordnance to a target, comprising:
a center body,
a first fin and a second fin,
wherein each of the first and second fins is mounted on opposing sides of the center body;
an electric motor mounted to the center body,
wherein the electric motor is configured to drive a propeller for providing thrust to propel the weapon delivery system, and
wherein the electric motor is configured to be remotely started by a user;
a video device mounted to the center body,
wherein the video device is configured to provide the user with images for viewing a theater of operations of the weapon delivery system for remotely steering the weapon delivery system into the target; and
a payload,
wherein the payload is configured to store the ordnance, and
wherein the weapon delivery system is configured to weigh less than about five pounds.

\* \* \* \* \*